(12) United States Patent
Read

(10) Patent No.: US 7,242,325 B2
(45) Date of Patent: Jul. 10, 2007

(54) ERROR CORRECTION COMPENSATING ONES OR ZEROS STRING SUPPRESSION

(75) Inventor: Christopher J Read, San Diego, CA (US)

(73) Assignees: Sony Corporation, Shinagawa, Tokyo (JP); Sony Electronics Inc., Park Ridge, NJ (US)

( * ) Notice: Subject to any disclaimer, the term of this patent is extended or adjusted under 35 U.S.C. 154(b) by 460 days.

(21) Appl. No.: 10/910,433

(22) Filed: Aug. 2, 2004

(65) Prior Publication Data

US 2006/0026483 A1  Feb. 2, 2006

(51) Int. Cl.
*H03M 7/46* (2006.01)

(52) U.S. Cl. .............................. 341/58; 341/59; 714/809

(58) Field of Classification Search .................. 341/58, 341/59; 714/809; *H03M 7/46, 7/48*
See application file for complete search history.

(56) References Cited

U.S. PATENT DOCUMENTS

| 5,497,468 | A | 3/1996 | Tani et al. | 395/375 |
|---|---|---|---|---|
| 5,509,129 | A | 4/1996 | Guttag et al. | 395/375 |
| 5,512,896 | A | 4/1996 | Read et al. | 341/65 |
| 5,742,538 | A | 4/1998 | Guttag et al. | 364/754.01 |
| 6,032,170 | A | 2/2000 | Guttag et al. | 708/620 |
| 6,240,437 | B1 | 5/2001 | Guttag et al. | 708/524 |
| 6,370,558 | B1 | 4/2002 | Guttag et al. | 708/603 |
| 6,499,076 | B2 | 12/2002 | Date et al. | 710/113 |
| 6,571,309 | B2 | 5/2003 | Ando et al. | 711/4 |
| 6,594,725 | B2 | 7/2003 | Ando et al. | 711/112 |
| 6,609,175 | B1 | 8/2003 | Ando et al. | 711/112 |
| 6,643,814 | B1 | 11/2003 | Cideciyan et al. | 714/755 |
| 7,199,955 | B2 * | 4/2007 | Hirano et al. | 341/59 |
| 2002/0049949 | A1 * | 4/2002 | Shimoda | 714/755 |
| 2005/0168358 | A1 * | 8/2005 | Kuznetsov et al. | 341/59 |

FOREIGN PATENT DOCUMENTS

JP  11007736 A * 1/1999

* cited by examiner

*Primary Examiner*—R. Stephen Dildine
(74) *Attorney, Agent, or Firm*—Haverstock & Owens LLP

(57) ABSTRACT

An error correction compensating ones or zeros string suppression system and method for use in a digital transmission system is herein disclosed. In digital transmission systems utilizing error control coding (ECC)/forward error correction (FEC) to reduce the number of bit errors in a bit stream, long strings of ones and zeros are easily suppressed by detecting a prohibited length of ones or zeros, and flipping a bit in the string of ones or zeros. This method and system removes the violation of the ones or zeros bit string requirement by flipping a bit in the string, while the receiving side utilizes the error correction capability of the ECC/FEC to correct the inverted bit.

64 Claims, 4 Drawing Sheets

ERROR CORRECTION COMPENSATING ONES OR ZEROS STRING SUPPRESSION

FIELD OF THE INVENTION

The present invention relates to the field of digital transmission systems. More particularly, the present invention relates to bit stream error correction in digital transmission systems.

BACKGROUND

In digital transmission systems today, the transmission of long strings of ones or zeros may be prohibited. This practice can be attributed to a variety of system constraints such as DC bias drift or clock synchronization. In order to transmit long streams of ones and zeros, this prohibition must be compensated for in the system design.

Different solutions have been attempted to compensate for this prohibition. One prior art solution is called an 8/10 code, which could be implemented by augmenting each byte by two bits, a one and a zero. This solution insures that there is both a one and a zero in every ten (10) bits, and no string of bits longer than nine (9) would ever be all zeros or all ones. FIG. 1A depicts such a solution. Referring to FIG. 1A, an 8/10 string 100 is illustrated. Here, a byte 104 including a string of ones is augmented by a pair of augmentation bits 102, where the augmentation bits 102 include both a one and a zero, as shown. Likewise, the byte 104 could be a string of zeros as well. In either case, the addition of the augmentation bits 102 insures that every 8/10 string 100 includes at least one zero and at least one one. This prior art solution adds two (2) bits to every byte 104 transmitted by the system.

Further prior art solutions include a more intelligent 8/10 code that chooses a more uniform set of code words. FIG. 1B depicts such a solution. Here, the look up table solution 110 includes sending a byte 112 to a look up table 114 before it is transmitted. The look up table 114 includes a ten bit code 116 for every byte 112 combination, where every ten bit code 116 is made up of five (5) zeros and five (5) ones, thus restricting strings of ones or zeros to five (5) in a row. When the ten bit code 116 is received, it will be decoded by a similar look up table 114 back to the original byte 112. This prior art solution also adds two (2) bits to every byte 104 transmitted by the system, as well as the additional overhead associated with incorporating look up tables 114 into such a system.

Further prior art solutions include the technique of appending a one bit and a zero bit to a case of longer lengths of all one or all zero strings. For example, if strings of eighty (80) bits of zeros or ones were prohibited, then every seventy eight (78) bits, a zero or a one could be injected. This would limit strings of bits to seventy nine (79) zeros or seventy nine (79) ones. FIG. 1C depicts such a solution. Referring to FIG. 1C, the long string solution 120 is illustrated. Here, a prohibited string 126 including a string of ones is augmented by a pair of augmentation bits 122, where the augmentation bits 122 include both a one and a zero, as shown. Likewise, the augmented string 124 could be a string of zeros as well, and the number of bits in the prohibited string 126 is dependent upon the system constraints. In any case, the addition of the augmentation bits 122 insures that every prohibited string 126 includes at least one zero and at least one one. This prior art solution adds two (2) bits to every augmented string 124 transmitted by the system.

Thus far, all of these prior art solutions add overhead to the system when transmitting or receiving such a stream of data. In other words, each prior art solution adds significant bits to the streams, thus adding significant expense to the system to eliminate the possibility of long strings of zeros or ones.

As such, no techniques have as yet been devised to compensate for bit suppression without adding significant bits, and therefore costs, to the system.

SUMMARY

An error correction compensating ones or zeros string suppression system and method for use in a digital transmission system is herein disclosed. In digital transmission systems utilizing error control coding (ECC)/forward error correction (FEC) to reduce the number of bit errors in a bit stream, long strings of ones and zeros are easily suppressed by detecting a prohibited length of ones or zeros, and flipping a bit in the string of ones or zeros. This method and system removes the violation of the ones or zeros bit string requirement by flipping a bit in the string, while the receiving side utilizes the error correction capability of the ECC/FEC to correct the inverted bit.

In one aspect of the present invention, a method of error correction comprises testing a bit string for a prohibited condition, flipping a correction bit in a bit string if the bit string violates the prohibited condition, to produce a compensated bit string, transmitting the compensated bit string and correcting the correction bit to produce a corrected bit string, wherein the corrected bit string is identical to the bit string. The testing and the flipping are performed by an encoder, the prohibited condition is a predetermined number of identical bits based on a set of system constraints and the compensated bit string includes a pair of non-prohibited bit strings separated by the correction bit, wherein one of the pair of non-prohibited bit strings may have a length of zero bits.

The method also includes when the compensated bit string is transmitted, the compensated bit string is received by a receiver, and further wherein the receiver includes a decoder and a controller. The correcting is performed by the decoder, and further wherein the correcting returns the correction bit back to an original value. The decoder utilizes an error control coding method to correct the correction bit to produce the corrected bit string, or the decoder utilizes a forward error correction method to correct the correction bit to produce the corrected bit string.

In another aspect of the present invention, a method of error correction compensating ones or zeros string suppression in a digital transmission system comprises testing a bit string for a prohibited bit string width, flipping a correction bit in the bit string if the bit string is of the prohibited bit string width, to produce a compensated bit string, transmitting the compensated bit string and correcting the correction bit to produce a corrected bit string, wherein the corrected bit string is identical to the bit string. The testing and the flipping are performed by an encoder, the prohibited bit string width is a predetermined number of identical bits based on a set of system constraints and the compensated bit string includes a pair of non-prohibited bit strings separated by the correction bit, wherein one of the pair of non-prohibited bit strings may have a length of zero bits.

The method also includes when the compensated bit string is transmitted, the compensated bit string is received by a receiver, and further wherein the receiver includes a decoder and a controller. The correcting is performed by the decoder, and further wherein the correcting returns the correction bit back to an original value. The decoder utilizes an error control coding method to correct the correction bit to produce the corrected bit string, or the decoder utilizes a forward error correction method to correct the correction bit to produce the corrected bit string.

In another aspect of the present invention, a digital transmission system for error correction compensating ones or zeros string suppression comprises means for testing a bit string for a prohibited bit string width, means for flipping a correction bit in the bit string if the bit string is of the prohibited bit string width, to produce a compensated bit string and means for transmitting the compensated bit string. The means for testing and the means for flipping include an encoder. The prohibited bit string width is a predetermined number of identical bits based on a set of system constraints. The compensated bit string includes a pair of non-prohibited bit strings separated by the correction bit, wherein one of the pair of non-prohibited bit strings may have a length of zero bits.

The digital transmission system also includes means for correcting the correction bit to produce a corrected bit string, wherein the corrected bit string is identical to the bit string. When the compensated bit string is transmitted, the compensated bit string is received by a receiver, and further wherein the receiver includes a decoder and a controller. The means for correcting include the decoder, and further wherein the means for correcting returns the correction bit back to an original value. The decoder utilizes an error control coding method to correct the correction bit to produce the corrected bit string, or a forward error correction method to correct the correction bit to produce the corrected bit string.

In another aspect of the present invention, a digital transmission system for error correction compensating ones or zeros string suppression comprises an encoder configured for testing a bit string for a prohibited bit string width and flipping a correction bit in the bit string if the bit string is of the prohibited bit string width, to produce a compensated bit string and a transmitter coupled to the encoder and configured for transmitting the compensated bit string. The prohibited bit string width is a predetermined number of identical bits based on a set of system constraints. The compensated bit string includes a pair of non-prohibited bit strings separated by the correction bit, wherein one of the pair of non-prohibited bit strings may have a length of zero bits. When the compensated bit string is transmitted, the compensated bit string is received by a receiver, and further wherein the receiver includes a controller and a decoder.

The digital transmission also includes a decoder configured for correcting the correction bit to produce a corrected bit string, wherein the corrected bit string is identical to the bit string. The decoder returns the correction bit back to an original value. The decoder utilizes an error control coding method to correct the correction bit to produce the corrected bit string, or the decoder utilizes a forward error correction method to correct the correction bit to produce the corrected bit string. The transmitter includes the encoder and a controller.

In another aspect of the present invention, a method of transmitting a bit string in a digital transmission system comprises compressing a data signal into a bit stream, testing the bit string for a prohibited bit string width, flipping a correction bit in the bit string if the bit string is of the prohibited bit string width, to produce a compensated bit string, sending the compensated bit string and correcting the correction bit to produce a corrected bit string, wherein the corrected bit string is identical to the bit string. A transmitter is configured to perform the compressing, testing, flipping and sending, and includes a controller configured to perform the compressing and an encoder to perform the testing and flipping. The prohibited bit string width is a predetermined number of identical bits based on a set of system constraints. The compensated bit string includes a pair of non-prohibited bit strings separated by the correction bit, wherein one of the pair of non-prohibited bit strings may have a length of zero bits.

The method also includes when the compensated bit string is transmitted along a transmission channel, the compensated bit string is received by a receiver, and further wherein the receiver includes a decoder configured to effectuate the correcting step and a controller. The correcting returns the correction bit back to an original value. The decoder utilizes an error control coding method to correct the correction bit to produce the corrected bit string, or a forward error correction method to correct the correction bit to produce the corrected bit string.

In another aspect of the present invention, a digital system for transmitting a bit string comprises a transmitter including an encoder configured for testing a bit string for a prohibited bit string width, the encoder further configured for flipping a correction bit in the bit string if the bit string is of the prohibited bit string width, to produce a compensated bit string and a transmitting communications interface coupled to the encoder and configured for transmitting the compensated bit string, and a receiver including a receiving communications interface configured for receiving the compensated bit string and a decoder coupled to the receiving communications interface and configured to receive the compensated bit string and correct the correction bit to produce a corrected bit string, wherein the corrected bit string is identical to the bit string, wherein the transmitter and the receiver are in communication with a transmission channel configured to carry the compensated bit string. The prohibited bit string width is a predetermined number of identical bits based on a set of system constraints. The compensated bit string includes a pair of non-prohibited bit strings separated by the correction bit, wherein one of the pair of non-prohibited bit strings may have a length of zero bits. The decoder returns the correction bit back to an original value. The decoder utilizes an error control coding method to correct the correction bit to produce the corrected bit string, or a forward error correction method to correct the correction bit to produce the corrected bit string.

In another aspect of the present invention, a digital system for receiving a compensated bit string, the digital system comprising a receiver, wherein the receiver includes a decoder configured for receiving a compensated bit string, wherein the compensated bit string is produced by flipping a correction bit in an original bit string if the original bit string is of a prohibited bit string width, and the decoder is further configured for correcting the correction bit to produce a corrected bit string, wherein the corrected bit string is identical to the original bit string, wherein the receiver is in communication with a transmitter over a transmission channel configured to transmit the compensated bit string.

The transmitter of the digital system also includes an encoder configured for testing the bit string for the prohibited bit string width, and further configured for flipping the correction bit, wherein the transmitter is configured for transmitting the compensated bit string. The prohibited bit string width is a predetermined number of identical bits based on a set of system constraints. The compensated bit string includes a pair of non-prohibited bit strings separated by the correction bit, wherein one of the pair of non-prohibited bit strings may have a length of zero bits. The decoder returns the correction bit back to an original value. The decoder utilizes an error control coding method to correct the correction bit to produce the corrected bit string, or a forward error correction method to correct the correction bit to produce the corrected bit string. The transmission channel is wired or wireless.

DETAILED DESCRIPTION OF THE EMBODIMENTS

An error correction compensating ones or zeros string suppression system and method for use in a digital transmission system is herein disclosed. An embodiment of the method 200 is depicted in FIG. 2.

Figure 1A:
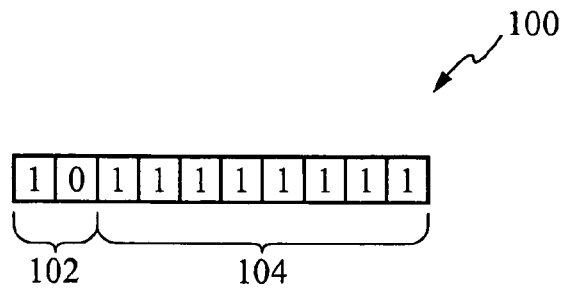
FIGS. 1A-1C illustrate a graphical depiction of the prior art solutions.
Figure 1B:
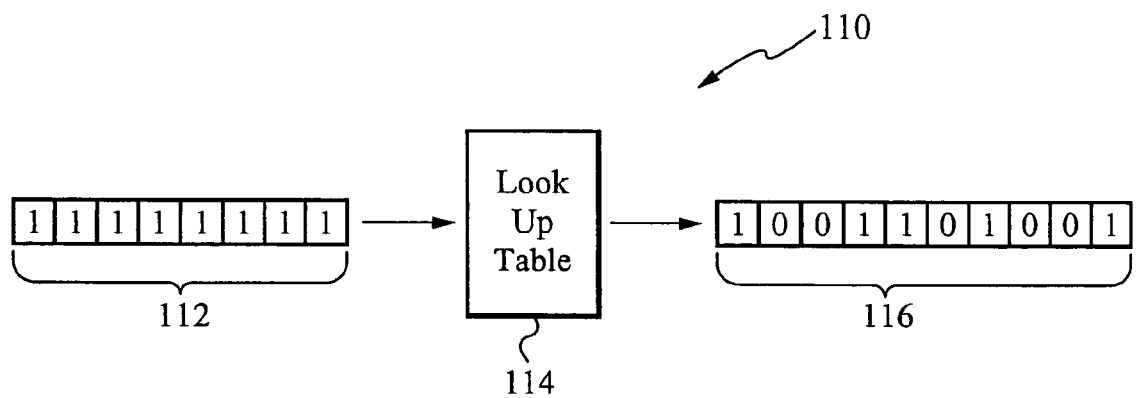
Figure 1C:
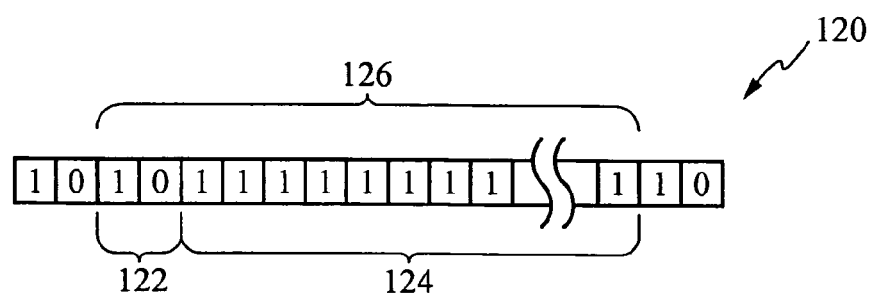
Figure 2:
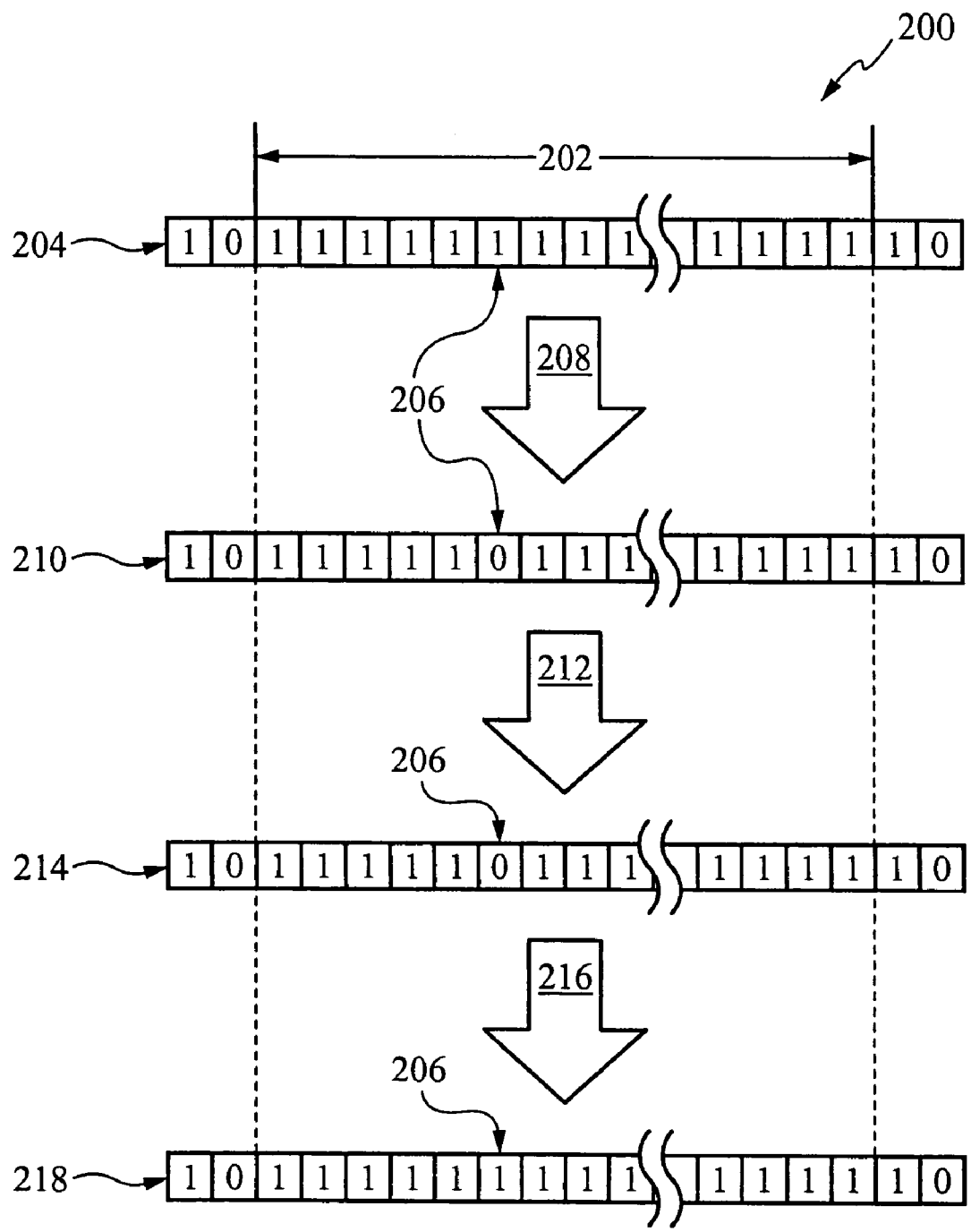
FIG. 2 illustrates a graphical depiction of a method of error correction compensating ones or zeros string suppression.

Referring to FIG. 2, the method 200 includes a data string 204 to which error control coding (ECC)/forward error correction (FEC) has been applied and that is ready for transmission, where the data string 204 includes a long string of ones or zeros. A prohibited string width 202 is the number of consecutive ones or zeros that are prohibited by a given system. The number of consecutive ones or zeros that violate the prohibited string width is determined by system constraints as described above.

In the test step 208, the data string is tested to determine whether the data string 204 includes a string of ones or zeros that is equal to or greater than the prohibited string width 202. If the test step 208 detects a string that violates the prohibited string width 202, then the test step 208 "flips" or changes a compensated bit 206, thus breaking the consecutive strings of ones and zeros in the data string 204.

Still referring to FIG. 2, the compensated data string 210 is shown with a compensated bit 206 that has been changed from a one to a zero in order to break the consecutive string of ones in the data string 204 that violated the prohibited string width 202. The compensated data string 210 then includes a pair of non-prohibited strings separated by the compensation bit 206. It should be noted that the compensation bit 206 may be placed anywhere within the data string 204, and it is conceivable that the compensation bit 206 could be the last bit in the compensated data string 210, thus creating a compensated data string 210 wherein one of the pair of non-prohibited bit strings has a length of zero bits. In the transmission step 212, the compensated data string 210 is sent over a transmission channel to a receiver (not shown). Aside from any transmission errors, the received data string 214 is identical to the compensated data string, as it includes the compensated bit 206 that was changed by the test step 208.

In the correction step 216, the system utilizes an error control coding (ECC)/forward error correction (FEC) system in the receiver to detect the compensated bit 206, which is actually a purposely created error bit. The correction step 216 also corrects the compensated bit 206 by "flipping" or changing it back to the original value of the compensated bit 206 in the data string 204. This method 200 is repeated for every string of ones or zeros that violates the prohibited string width 202 and is detected by the test step 208.

Figure 3:
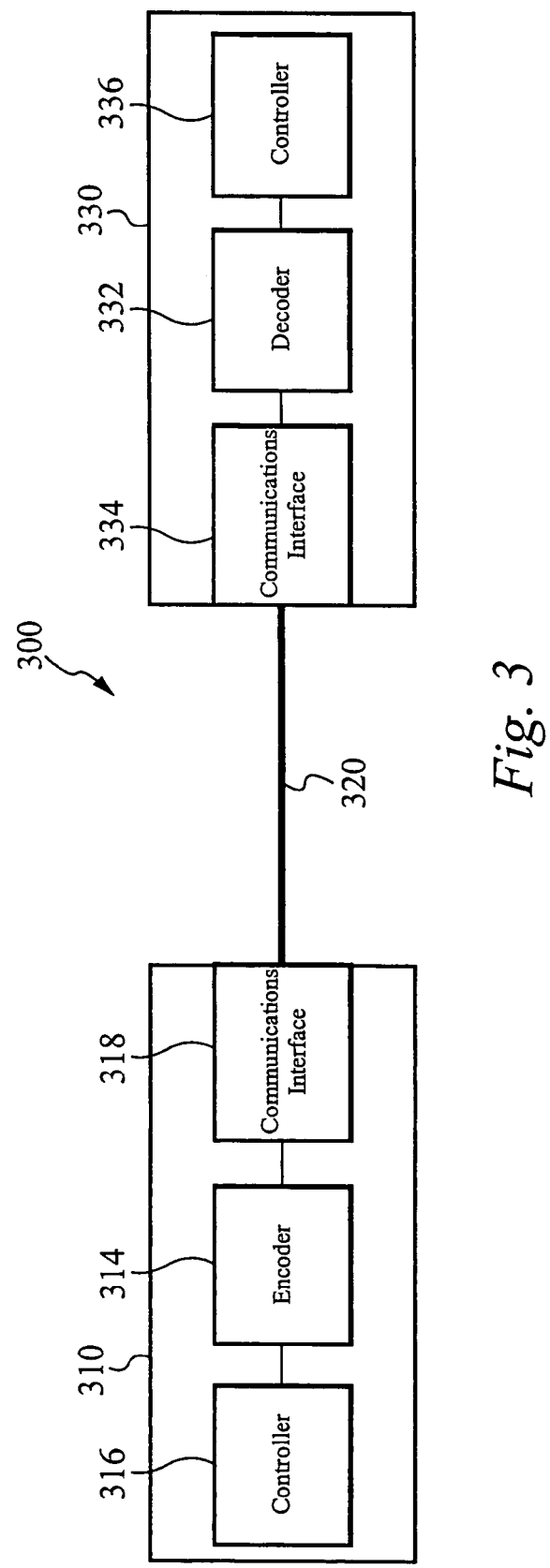
FIG. 3 illustrates a block diagram of a system for error correction compensating ones or zeros string suppression.

FIG. 3 illustrates a digital transmission system 300 of an embodiment of the invention including a transmitting device 310 and a receiving device 330. The transmitting device 310 includes a controller 316, an encoder 314 and a communications interface 318. The controller 316 instructs the various components of the transmitting device 310 in order to effectuate the transmission of a data string. The controller 316 prepares the data string for transmission by compressing the data and sending it to the encoder 314 before it is transmitted through the communication interface 318 to the receiving device 330.

Still referring to FIG. 3, an embodiment also includes the encoder 314 monitoring the data string for strings of ones or zeros that are equal to or greater than the prohibited string width. The encoder 314 monitors such data strings after error control coding (ECC)/forward error correction (FEC) has been applied and the data string is ready for transmission. When the encoder 314 detects such a string, the encoder 314 changes a bit in the stream from a zero to a one, or from a one to a zero, depending on the string, and then transmits the data string through the communications interface 318 onto the transmission channel 320 and to the receiving device 330. The transmission channel 320 is any appropriate medium including but not limited to a wired or wireless local or wide area network. The operation of both the encoder 314 and the communications interface 318 in the transmitting device 310 are regulated by the controller 316, as is the operation of the entire transmitting device 310.

Still referring to FIG. 3, the communications interface 334 of the receiving device 330 receives the data string from the transmitting device 310 through the transmission channel 320. The communications interface 334 provides the received data to the decoder 332. The decoder 332 utilizes an ECC/FEC to detect the bit that was changed by the encoder 314 in order to prevent any portion of the data string from having a prohibited string width. The decoder 332, through the ECC/FEC, corrects the changed bit by returning the bit to its original value. The controller 336 of the receiving device 330 then instructs the decoder 332 to send the decoded data string to the controller 336 where it is decompressed and prepared appropriately according to the requirements of the receiving system 330. The operation of both the decoder 332 and the communications interface 334 in the receiving device 330 are regulated by the controller 336, as is the operation of the entire receiving device 330.

Figure 4:
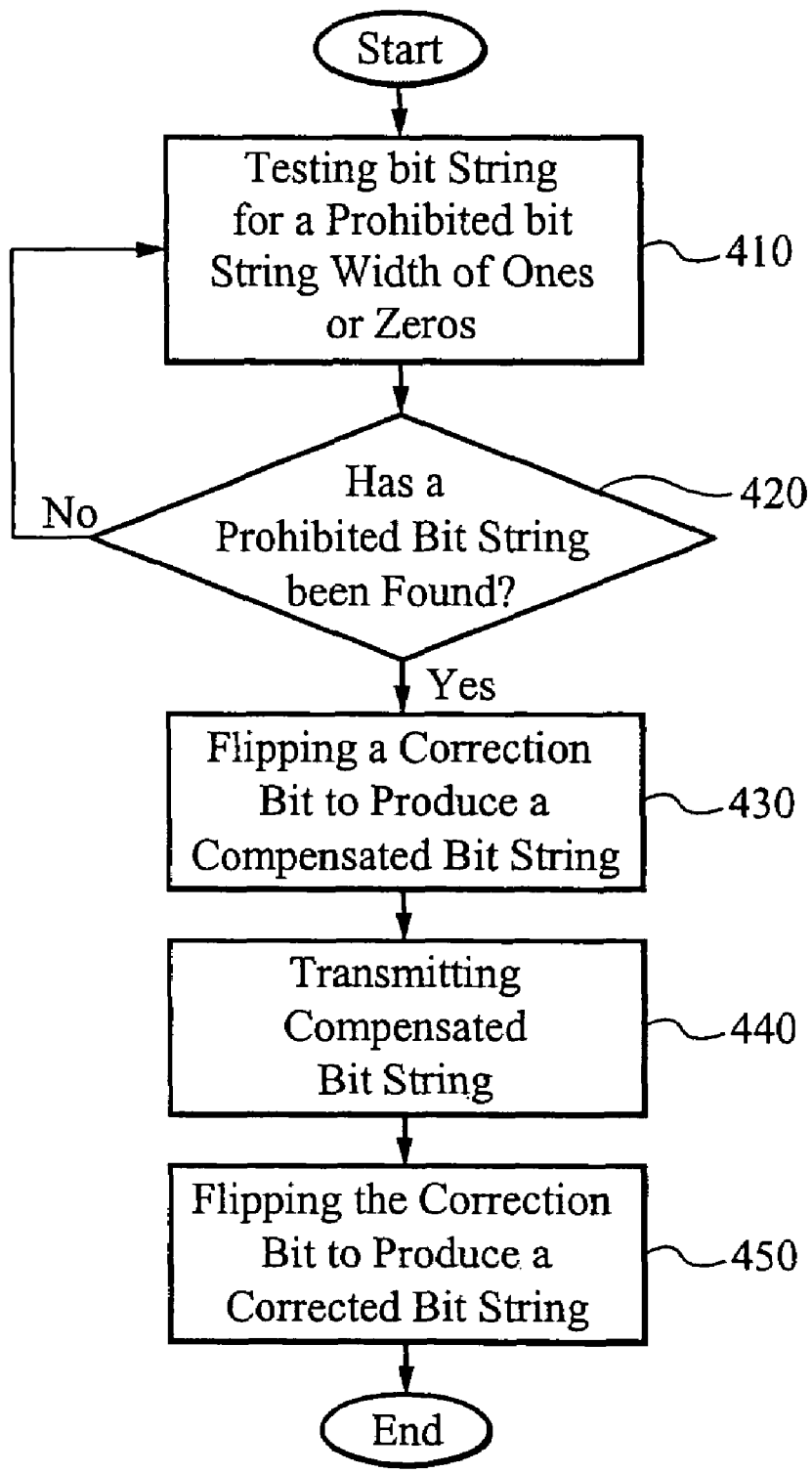
FIG. 4 illustrates a flow chart of an error correction compensating ones or zeros string suppression.

Referring now to FIG. 4, a flow chart of an error correction compensating of ones or zeros string suppression system is depicted. In step 410, a bit string to which error control coding (ECC)/forward error correction (FEC) has been applied is tested for a prohibited bit string width of ones or zeros by an encoder 314 (FIG. 3). The prohibited string length depends on the current system, and common width definers includes constraints such as DC bias shift and clock synchronization. In step 420, if a prohibited bit string has been detected by the encoder 314, then the method continues on to step 430. If no prohibited bit string is detected by the encoder 314 in step 420, the method continues to test the bit string for prohibited bit string widths of ones and zeros in step 410.

Still referring to FIG. 4, in step 430 a bit in the prohibited bit string is flipped by the encoder 314 (FIG. 3) from a one to a zero, or from a zero to a one, depending on the nature of the prohibited bit string, i.e., whether the prohibited bit string is all ones or all zeros. This action splits the prohibited bit string into a compensated bit string including two separate bit strings of ones or two separate bit strings of zeros, where the two strings are separated by the flipped bit, or the correction bit.

Step 430 eliminates the prohibited bit string by flipping the correction bit, thus generating from the prohibited bit string a compensated bit string, having two bit strings that do not violate the maximum bit string width, separated by the correction bit. It should be noted that the bit may be flipped anywhere within the data string, and it is conceivable that the flipped bit could be the last bit in the compensated data string, thus creating a compensated data string having a pair of non-prohibited bit strings wherein one of the pair of non-prohibited bit strings has a length of zero bits. In an embodiment, Step 410, as well as steps 420 and 430, are carried out by the encoder 314 of the transmitting device 310. Once the prohibited bit string is changed in the encoder 314 to form the compensated bit string, the compensated bit string is transmitted in step 440 through the communications interface 318 onto the transmission channel 320, as the compensated bit string is not violative of the prohibitive bit string width.

Still referring to FIG. 4, when the compensated bit string reaches the communications interface 334 of the receiving device 330 (FIG. 3), the receiving device's 330 ECC or FEC system (housed in the decoder 332) detects the correction bit and flips the correction bit back to its original value in step 450, before the method ends. This returns a corrected bit string that is identical to the original bit string that was detected in step 410 before the correction bit was flipped in step 430. In an embodiment, step 450 is carried out in the decoder 332 of the receiving device 330.

In operation, the digital transmission system 300 includes a transmitting device 310 and a receiving device 330. The transmitting device 310 includes a controller 316, an encoder 314 and a communications interface 318, and the receiving device 330 includes a decoder 332, a controller 336 and a communications interface 334, wherein the transmitting device 310 and the receiving device 330 communicate over a transmission channel 320. The transmission channel 320 is any appropriate medium including but not limited to a wired or wireless local or wide area network. In operation, the controller 316 of the transmitting device 310 prepares a bit string for transmitting to the receiving device 330. The controller 316 of the transmitting device 310 sends the bit string to the encoder 314, where the encoder 314 tests the bit string for a prohibited bit string width of ones or zeros, and if a prohibited bit string width is found, the encoder 314 will flip a correction bit to produce a compensated bit string.

In operation, the encoder 314 will then transmit the compensated bit string through a communications interface 318 onto the transmission channel 320 to the communications interface 334 of the receiving device 330, where the decoder 332 receives the compensated bit string, and using ECC or FEC, flips the correction bit to produce a corrected bit string, which is then passed on to the controller 336. The controller 336 controls the operation of the receiving device 330.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and have several different appearances.

What is claimed is:

1. A method of error correction, the method comprising:
   a. testing a bit string for a prohibited condition;
   b. flipping a correction bit in a bit string if the bit string violates the prohibited condition, to produce a compensated bit string;
   c. transmitting the compensated bit string; and
   d. correcting the correction bit to produce a corrected bit string, wherein the corrected bit string is identical to the bit string.

2. The method according to claim 1, wherein the testing and the flipping are performed by an encoder.

3. The method according to claim 1, wherein the prohibited condition is a predetermined number of identical bits based on a set of system constraints.

4. The method according to claim 1, wherein the compensated bit string includes a pair of non-prohibited bit strings separated by the correction bit.

5. The method according to claim 4, wherein one of the pair of non-prohibited bit strings has a length of zero bits.

6. The method according to claim 1, wherein when the compensated bit string is transmitted, the compensated bit string is received by a receiver, and further wherein the receiver includes a decoder and a controller.

7. The method according to claim 6, wherein the correcting is performed by the decoder, and further wherein the correcting returns the correction bit back to an original value.

8. The method according to claim 7, wherein the decoder utilizes an error control coding method to correct the correction bit to produce the corrected bit string.

9. The method according to claim 7, wherein the decoder utilizes a forward error correction method to correct the correction bit to produce the corrected bit string.

10. A method of error correction compensating ones or zeros string suppression in a digital transmission system, the method comprising:
    a. testing a bit string for a prohibited bit string width;
    b. flipping a correction bit in the bit string if the bit string is of the prohibited bit string width, to produce a compensated bit string;
    c. transmitting the compensated bit string; and
    d. correcting the correction bit to produce a corrected bit string, wherein the corrected bit string is identical to the bit string.

11. The method according to claim 10, wherein the testing and the flipping are performed by an encoder.

12. The method according to claim 10, wherein the prohibited bit string width is a predetermined number of identical bits based on a set of system constraints.

13. The method according to claim 10, wherein the compensated bit string includes a pair of non-prohibited bit strings separated by the correction bit.

14. The method according to claim 13, wherein one of the pair of non-prohibited bit strings has a length of zero bits.

15. The method according to claim 10, wherein when the compensated bit string is transmitted, the compensated bit string is received by a receiver, and further wherein the receiver includes a decoder and a controller.

16. The method according to claim 15, wherein the correcting is performed by the decoder, and further wherein the correcting returns the correction bit back to an original value.

17. The method according to claim 16, wherein the decoder utilizes an error control coding method to correct the correction bit to produce the corrected bit string.

18. The method according to claim 16, wherein the decoder utilizes a forward error correction method to correct the correction bit to produce the corrected bit string.

19. A digital transmission system for error correction compensating ones or zeros string suppression, the digital transmission system comprising:
 a. means for testing a bit string for a prohibited bit string width;
 b. means for flipping a correction bit in the bit string if the bit string is of the prohibited bit string width, to produce a compensated bit string; and
 c. means for transmitting the compensated bit string.

20. The digital transmission system according to claim 19, wherein the means for testing and the means for flipping include an encoder.

21. The digital transmission system according to claim 19, wherein the prohibited bit string width is a predetermined number of identical bits based on a set of system constraints.

22. The digital transmission system according to claim 19, wherein the compensated bit string includes a pair of non-prohibited bit strings separated by the correction bit.

23. The digital transmission system according to claim 22, wherein one of the pair of non-prohibited bit strings has a length of zero bits.

24. The digital transmission system according to claim 19, further comprising means for correcting the correction bit to produce a corrected bit string, wherein the corrected bit string is identical to the bit string.

25. The digital transmission system according to claim 24, wherein when the compensated bit string is transmitted, the compensated bit string is received by a receiver, and further wherein the receiver includes a decoder and a controller.

26. The digital transmission system according to claim 25, wherein the means for correcting include the decoder, and further wherein the means for correcting returns the correction bit back to an original value.

27. The digital transmission system according to claim 26, wherein the decoder utilizes an error control coding method to correct the correction bit to produce the corrected bit string.

28. The digital transmission system according to claim 27, wherein the decoder utilizes a forward error correction method to correct the correction bit to produce the corrected bit string.

29. A digital transmission system for error correction compensating ones or zeros string suppression, the digital transmission system comprising:
 a. an encoder configured for testing a bit string for a prohibited bit string width and flipping a correction bit in the bit string if the bit string is of the prohibited bit string width, to produce a compensated bit string; and
 b. a transmitter coupled to the encoder and configured for transmitting the compensated bit string.

30. The digital transmission system according to claim 29, wherein the prohibited bit string width is a predetermined number of identical bits based on a set of system constraints.

31. The digital transmission system according to claim 29, wherein the compensated bit string includes a pair of non-prohibited bit strings separated by the correction bit.

32. The digital transmission system according to claim 31, wherein one of the pair of non-prohibited bit strings has a length of zero bits.

33. The digital transmission system according to claim 29, wherein when the compensated bit string is transmitted, the compensated bit string is received by a receiver, and further wherein the receiver includes a controller and a decoder.

34. The digital transmission system according to claim 29, further comprising a decoder configured for correcting the correction bit to produce a corrected bit string, wherein the corrected bit string is identical to the bit string.

35. The digital transmission system according to claim 34, wherein the decoder returns the correction bit back to an original value.

36. The digital transmission system according to claim 35, wherein the decoder utilizes an error control coding method to correct the correction bit to produce the corrected bit string.

37. The digital transmission system according to claim 35, wherein the decoder utilizes a forward error correction method to correct the correction bit to produce the corrected bit string.

38. The digital transmission system according to claim 29, wherein the transmitter includes the encoder and a controller.

39. A method of transmitting a bit string in a digital transmission system, the method comprising:
 a. compressing a data signal into a bit string;
 b. testing the bit string for a prohibited bit string width;
 c. flipping a correction bit in the bit string if the bit string is of the prohibited bit string width, to produce a compensated bit string;
 d. sending the compensated bit string; and
 e. correcting the correction bit to produce a corrected bit string, wherein the corrected bit string is identical to the bit string.

40. The method according to claim 39, wherein a transmitter is configured to perform the compressing, testing, flipping and sending, further wherein the transmitter includes:
 a. a controller configured to perform the compressing; and
 b. an encoder to perform the testing and flipping.

41. The method according to claim 39, wherein the prohibited bit string width is a predetermined number of identical bits based on a set of system constraints.

42. The method according to claim 39, wherein the compensated bit string includes a pair of non-prohibited bit strings separated by the correction bit.

43. The method according to claim 42, wherein one of the pair of non-prohibited bit strings has a length of zero bits.

44. The method according to claim 39, wherein when the compensated bit string is transmitted along a transmission channel, the compensated bit string is received by a receiver, and further wherein the receiver includes:
 a. a decoder configured to effectuate the correcting step; and
 b. a controller.

45. The method according to claim 44, wherein the correcting returns the correction bit back to an original value.

46. The method according to claim 45, wherein the decoder utilizes an error control coding method to correct the correction bit to produce the corrected bit string.

47. The method according to claim 45, wherein the decoder utilizes a forward error correction method to correct the correction bit to produce the corrected bit string.

48. A digital system for transmitting a bit string, the digital system comprising:
- a. a transmitter including:
  - i. an encoder configured for testing a bit string for a prohibited bit string width, the encoder further configured for flipping a correction bit in the bit string if the bit string is of the prohibited bit string width, to produce a compensated bit string; and
  - ii. a transmitting communications interface coupled to the encoder and configured for transmitting the compensated bit string; and
- b. a receiver including:
  - i. a receiving communications interface configured for receiving the compensated bit string; and
  - ii. a decoder coupled to the receiving communications interface and configured to receive the compensated bit string and correct the correction bit to produce a corrected bit string, wherein the corrected bit string is identical to the bit string, wherein the transmitter and the receiver are in communication with a transmission channel configured to carry the compensated bit string.

49. The digital system according to claim 48, wherein the prohibited bit string width is a predetermined number of identical bits based on a set of system constraints.

50. The digital system according to claim 48, wherein the compensated bit string includes a pair of non-prohibited bit strings separated by the correction bit.

51. The digital system according to claim 50, wherein one of the pair of non-prohibited bit strings has a length of zero bits.

52. The digital system according to claim 48, wherein the decoder returns the correction bit back to an original value.

53. The digital system according to claim 52, wherein the decoder utilizes an error control coding method to correct the correction bit to produce the corrected bit string.

54. The digital system according to claim 52, wherein the decoder utilizes a forward error correction method to correct the correction bit to produce the corrected bit string.

55. A digital system for receiving a compensated bit string, the digital system comprising a receiver, wherein the receiver includes a decoder configured for receiving a compensated bit string, wherein the compensated bit string is produced by flipping a correction bit in an original bit string if the original bit string is of a prohibited bit string width, and the decoder is further configured for correcting the correction bit to produce a corrected bit string, wherein the corrected bit string is identical to the original bit string, wherein the receiver is in communication with a transmitter over a transmission channel configured to transmit the compensated bit string.

56. The digital system according to claim 55, wherein the transmitter includes an encoder configured for testing the bit string for the prohibited bit string width, and further configured for flipping the correction bit, wherein the transmitter is configured for transmitting the compensated bit string.

57. The digital system according to claim 56, wherein the prohibited bit string width is a predetermined number of identical bits based on a set of system constraints.

58. The digital system according to claim 55, wherein the compensated bit string includes a pair of non-prohibited bit strings separated by the correction bit.

59. The digital system according to claim 58, wherein one of the pair of non-prohibited bit strings has a length of zero bits.

60. The digital system according to claim 55, wherein the decoder returns the correction bit back to an original value.

61. The digital system according to claim 60, wherein the decoder utilizes an error control coding method to correct the correction bit to produce the corrected bit string.

62. The digital system according to claim 60, wherein the decoder utilizes a forward error correction method to correct the correction bit to produce the corrected bit string.

63. The digital system according to claim 55, wherein the transmission channel is wired.

64. The digital system according to claim 55, wherein the transmission channel is wireless.

* * * * *